United States Patent [19]

Pryor

[11] Patent Number: 5,602,967
[45] Date of Patent: Feb. 11, 1997

[54] VISION TARGET BASED ASSEMBLY

[75] Inventor: Timothy R. Pryor, Tecumseh, Canada

[73] Assignee: Sensor Adaptive Machines, Inc., Windsor, Canada

[21] Appl. No.: 471,222

[22] Filed: Jun. 6, 1995

Related U.S. Application Data

[62] Division of Ser. No. 875,282, Apr. 29, 1992, which is a continuation of Ser. No. 478,078, Feb. 9, 1990, Pat. No. 5,148,591, which is a continuation of Ser. No. 110,541, Oct. 20, 1987, abandoned, which is a continuation of Ser. No. 865,637, May 14, 1986, abandoned, which is a continuation of Ser. No. 660,280, Oct. 12, 1984, abandoned, which is a continuation-in-part of Ser. No. 348,803, Feb. 16, 1982, abandoned, Ser. No. 453,910, Dec. 28, 1982, abandoned, and Ser. No. 651,325, Sep. 17, 1984, Pat. No. 4,769,700, which is a continuation-in-part of Ser. No. 323,395, Nov. 20, 1981, Pat. No. 4,482,960, and Ser. No. 592,443, Mar. 22, 1984, Pat. No. 4,602,163, which is a continuation-in-part of Ser. No. 262,492, May 11, 1981, Pat. No. 4,453,085.

[51] Int. Cl.$^6$ .......................... G06F 15/46; H04N 7/18
[52] U.S. Cl. .................. 395/94; 395/86; 395/87; 395/88; 395/89
[58] Field of Search .................. 395/94, 89, 86, 395/87, 88; 364/474.24; 901/47

[56] References Cited

U.S. PATENT DOCUMENTS

| | | | |
|---|---|---|---|
| 4,044,377 | 8/1977 | Bowerman | 901/47 X |
| 4,146,924 | 3/1979 | Birk et al. | 395/94 |
| 4,190,890 | 2/1980 | Marx | 29/720 X |
| 4,219,847 | 8/1980 | Pinkney et al. | 901/47 X |
| 4,305,130 | 12/1981 | Kelley et al. | 395/94 |
| 4,314,402 | 2/1982 | Lemmer | 29/833 X |
| 4,380,696 | 4/1983 | Masaki | 395/94 |
| 4,396,945 | 8/1983 | DiMatteo | 901/47 X |
| 4,402,053 | 8/1983 | Kelley et al. | 395/94 |
| 4,409,650 | 10/1983 | Noguchi | 364/193 |
| 4,412,121 | 10/1983 | Kremers et al. | 901/47 X |
| 4,568,816 | 2/1986 | Casler, Jr. | 901/47 |
| 4,613,942 | 9/1986 | Chen | 901/47 |
| 4,639,878 | 1/1987 | Day et al. | 901/47 X |
| 4,670,298 | 6/1987 | Lucas et al. | 29/840 X |
| 4,742,464 | 5/1988 | Duret et al. | 364/474 |
| 4,754,415 | 6/1988 | George et al. | 395/94 |

FOREIGN PATENT DOCUMENTS

| | | | |
|---|---|---|---|
| 114505 | 8/1984 | European Pat. Off. | 901/9 |
| 2430058 | 1/1976 | France | 901/47 |
| 0219537 | 9/1986 | Japan | 29/720 |
| 0229252 | 9/1988 | Japan | 29/720 |

OTHER PUBLICATIONS

IBM Technical Disclosure Bulletin, vol 27 No. 6, Nov. 1984, pp. 3653–3655, M. S. Chester, M. A. Lovin, R. H. Taylor, "Chip–Placement Alignment Technique", copy available in class 29 subclass 833.

Decade of Robots 1983, pp. 30–33, Yoon Yong, Maurice Bonner, "Simulation: Preventing Some Nasty Snarl–ups", copy class 901, subclass 6.

Merritt, "Industrial Robots: Getting Smarter All The Time", Instruments Control Systems, Jul. 1982, pp. 32–38.

Hollingum, "Robots That See, Feel And Sense", The Engineer, Nov. 1980, pp. 45, 48.

Ruoff, "PACS–An Advanced Multitasking Robot System", The Industrial Robot, Jun. 1980, pp. 87–98.

Chester et al., "Chip–Placement Alignment Technique", IBM Technical Disclosure Bulletin, vol. 27, No. 6, pp. 3653–3655, Nov., 1984, p. 365.

Yong et al., "Simulation: Preventing Some Nearly Snarl–Ups", Decade of Robots, pp. 30–33, 1983.

*Primary Examiner*—George B. Davis
*Attorney, Agent, or Firm*—Larson and Taylor

[57] ABSTRACT

Methods and apparatuses for assemblying, handling, and fabrication are disclosed in which targets are used on objects. The targets can be specifically applied to the object, or can be an otherwise normal feature of the object. Conveniently, the targets are removable from the object or covered by another object during an assemblying process. One or more robots and imaging devices for the targets are used. The robots can be used to handle or assemble a part, or a fixture may be used in conjunction with the robots. Conveniently, the CAD design system is used in designing the targets as well as for the assembly process using the targets. A plurality of targets can also be used to monitor and inspect a forming process such as on a sheet panel.

20 Claims, 6 Drawing Sheets

VISION TARGET BASED ASSEMBLY

This application is a divisional of application Ser. No. 07/875,282, filed Apr. 29, 1992 which is a continuation of application Ser. No. 07/478,078, filed Feb. 9, 1990, U.S. Pat. No. 5,148,591, which is a continuation of application Ser. No. 07/110,541, filed Oct. 20, 1987, now abandoned, which is a continuation of application Ser. No. 061 865,637, filed May 14, 1986, now abandoned, which is a continuation of application Ser. No. 06/660,280, filed Oct. 12, 1984, now abandoned, which is a continuation-in-part of application Ser. No. 06/348,803, filed Feb. 16, 1982, now abandoned, and a continuation-in-part of application Ser. No. 06/453,910, filed Dec. 28, 1982, now abandoned, and a continuation-in-part of application Ser. No. 06/651,325, filed Sep. 17, 1984, U.S. Pat. No. 4,769,700, which is a continuation-in-part of application Ser. No. 06/323,395, filed Nov. 20, 1981, U.S. Pat. No. 4,482,960, and a continuation-in-part of application Ser. No. 06/592,443, filed Mar. 22, 1984, U.S. Pat. No. 4,602,163, which is a continuation-in-part of application Ser. No. 06/262,492, filed May 11, 1981, U.S. Pat. No. 4,453,085.

BACKGROUND OF THE INVENTION

The following are co-pending applications in the same field showing the state of the art which are herein incorporated by reference:

1. Method and Apparatus for Automatically Handling, Assembly or Working on Objects, or "Targets", Ser. No. 348,803.
2. Robot Calibration, Ser. No. 453,910
3. Electro-Optical Systems for Control of Robots, Manipulator Arms and Coordinate Measuring Machines, or "Robots and Manipulator Arms", Ser. No. 592,443.
4. Robot Tractors Ser. No. 323,395, now U.S. Pat. No. 4,482,960.
5. Robot Tractors, Vehicles and Machinery, Ser. No. 651,325.

These applications and the present invention are all commonly owned.

Flexible robot assembly is often very difficult in the absence of machine vision sensors to guide the operation. Even with such sensors, operation must be both accurate, ultra reliable, and fast enough to be justifiable relative to human labor. These criteria are seldom met by present day vision systems employing arbitrary gray level images and the like.

The target based invention described in reference 1 above has wide application to the assembly process. Described therein are several embodiments illustrating target based techniques which can overcome the limitations of present systems. The key to the use of the disclosed systems is that the target points on the part are easily discernable and unambiguous, after processing using rapid devices and other high speed analysis software.

The target system functions well because it is based on high contrast images and mathematical equations. To use targets one must know the part feature data base relative to the target points on the part. Targets on tooling, pallets and fixed members may also be of use. Special retro reflective targets give best contrast, but targets can be holes, corners or other easily determined natural part features.

Finally, where special targets are used which would not normally be present, techniques are disclosed to make these unobstrusive.

SUMMARY OF THE INVENTION

In accordance with the present invention, a method for controlling an assembly process is provided in which at least one first robot holds a first part in relation to a second part. Targets are provided on at least one of the robots or the first or second part. A TV camera then determines the position of the targets. From this determination, the assembly process is controlled.

In a preferred embodiment, the part held by the robot has a face on which the targets are located such that the TV camera can view these targets. In this manner, the robot is guided to handle or assemble the part.

A method for fabrication or assembly in which a fixture is provided is also disclosed. The location of a part having targets is determined with a TV camera and a robot then places the part on the fixture depending upon this determined location. A further object may be located on the fixture.

During a dynamic fabrication, it is also possible with the present invention to target the part so that corrections can be made during processing. Preferably, the targets are located in a finished assembly in such a manner as to be out of view. These targets can be covered up by a second object assembled with respect to the first object if applicable.

The present invention also includes a method for guiding objects into openings or onto protrusions. A plurality of target features are initially provided adjacent an opening or protrusion. These target features are imaged with a TV camera in order to determine the location of the target features. From this determined target location, an object is guided onto the opening or protrusion.

The present invention also makes use of a CAD system in a method of fabrication. Initially, the design of a finished assembly of parts is provided in a CAD system. The CAD system is also provided with individual part designs which are used to make up the assembly. These designs include special targets or natural features which serve as targets. The entire system is then provided with a logical progression of functions feeding program/functions to one or more robotic automation devices for assembly. Assembly is assisted by the use of TV cameras which are provided with the design data. The parts are then suitably assembled using images of the targets determined by the camera. Initially, the CAD system can be used to simulate the fabrication process.

In another preferred embodiment of the present invention, targets are provided on an object before a forming operation is performed. The location of the targets after forming are then determined. From this determined location, the attitude, shape, or dimension of the object or portions thereof are also determined. Depending upon the determined data, the handling, assemblying, inspecting, or working the object is then effected.

Other features and advantages of the present invention are stated or apparent from a detailed description of presently preferred embodiments of the invention found hereinbelow.

BRIEF DESCRIPTION OF THE DRAWINGS

FIGS. 3a and 3b schematically illustrate a dual robot version of the invention, with specialized target concepts including targets on two sides of parts, on end effectors and the like.

DETAILED DESCRIPTION OF THE PREFERRED EMBODIMENTS

Figure 1:
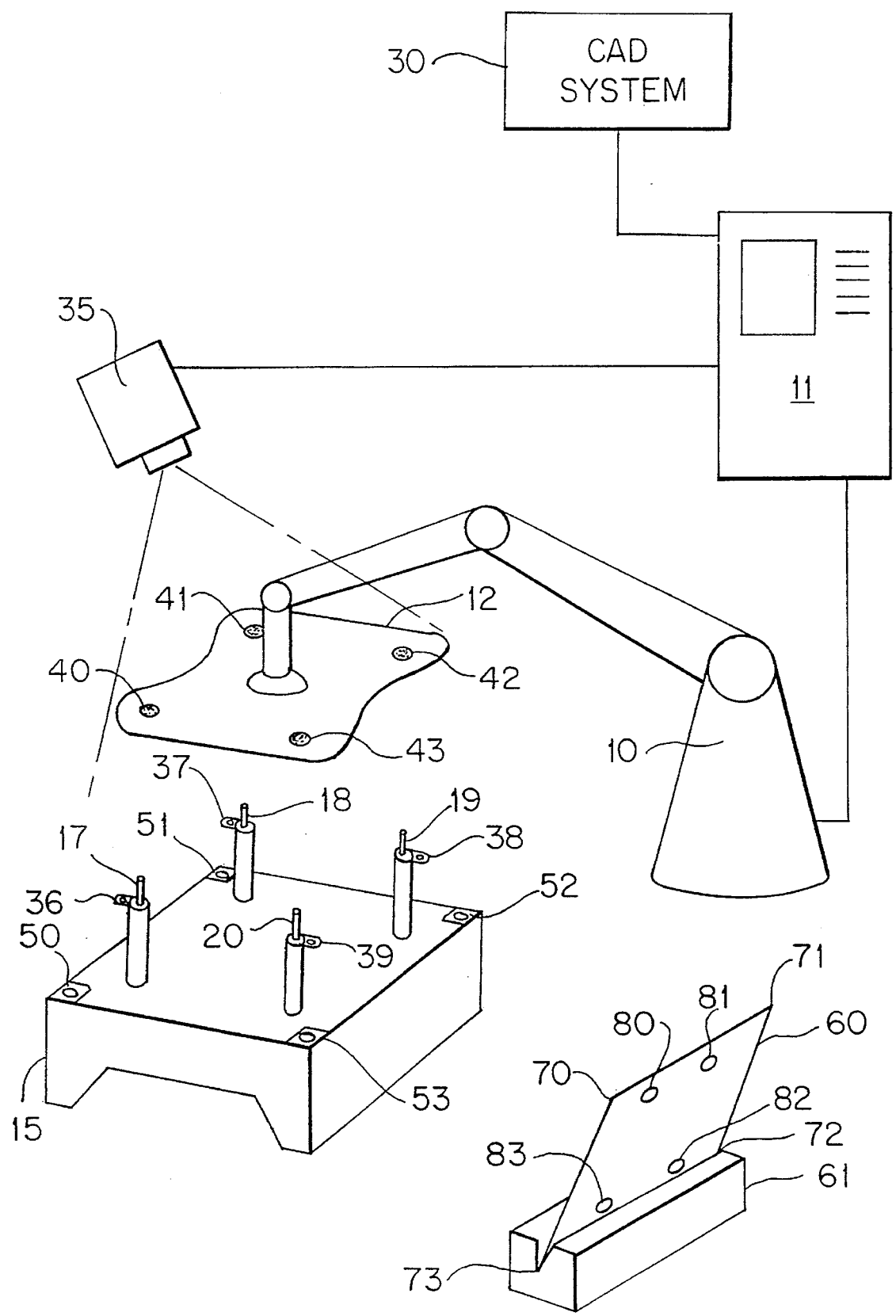
FIG. 1 schematically illustrates a targeted assembly fixture with part loading by a robot.

FIG. 1 illustrates an assembly operation using a robot 10 with a control computer 11 to place a part 12 of a car on an assembly fixture 15 which has been targeted according to the invention. As is desirable, the CAD system 30 (which has created the design for both the part and/or the fixture) has recorded the target data points 40, 41, 42 and 43 that are to be used by a camera unit 35 to locate the part 12 and/or the features of the part 12 that have been designated as targets plus the target points of the assembly fixture. It is noted that in some cases assembly fixtures are not required as pointed out below. When this data is obtained, the CAD system 30 downloads to the robot control 11 the description of the target point locations and the robot then homes in on these points using the present invention.

In a typical example, a hood inner support is part 12. Part 12 is loaded in a programmable manner from the download data onto locators 17, 18, 19 and 20 on a fixture 15 where targets 35, 37, 38 and 39 have been placed. Targets 35, 37, 38 and 39 are either on or near the locators 17, 18, 19 and 20, or on points 50, 51, 52 and 53 around the framework of the fixture 15 which are related to the locators 17, 18, 19 and 20. The camera system 35 located on the robot (or alternatively off the robot as shown) locates these points and guides the robot 10 in. Differential closing data between part and locators can be provided to allow a smooth close and mate operation.

To assemble hood outer panel 60 to the inner part 12, adhesive for example, is first applied to hood inner part 12. The adhesive is conveniently applied using the same robot 10 and using the fixture or part target data to guide the robot 10 (although once the part 12 is well-located on the fixture 15, it is known accurately enough in position to not require additional vision sensing except as a verification check).

The robot 10 goes and gets the hood outer panel located in rack 61 using either of two methods. First, it can locate the hood by its corner edges 70, 71, 72 and 73 as target points, grasp the outer panel 60 with a suction cup, and place it on the inner support part 12.

Another method is that the robot 10 grasps the panel 60 arbitrarily at the best estimated location on its outer surface. The robot 12 then presents the rear of the surface of panel 60 having holes 80, 81, 82, 83 to camera 35. Camera 35 then establishes the part reference to the robot so that the hood outer panel 60 can be reliably placed over the inner part 12 and joined.

Figure 2:
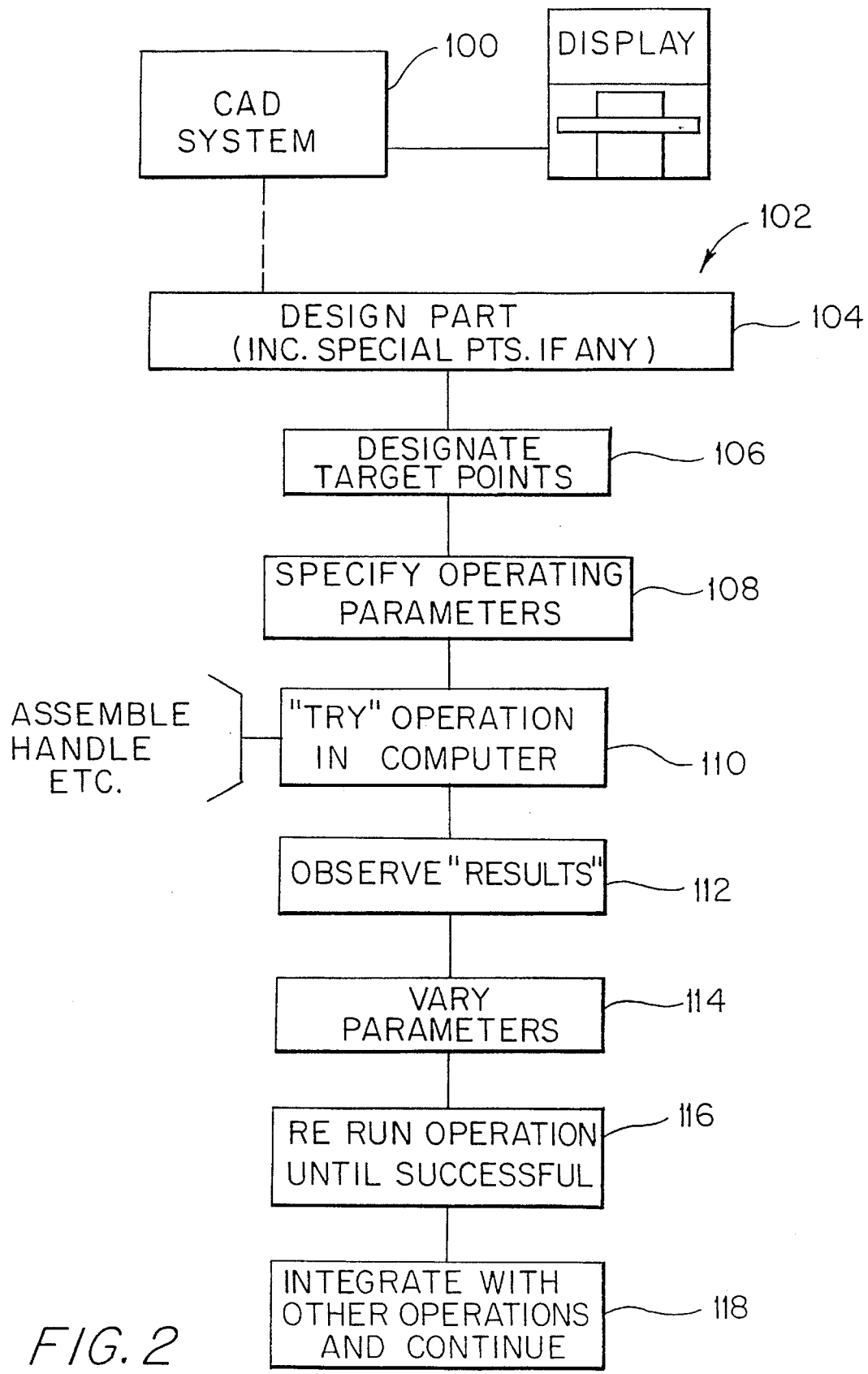
FIG. 2 is a simulation block diagram.

The fixture design and the target relationships to the part design can be optimally matched in the design computer 100 as shown in FIG. 2. This allows a simulation routine 102 of the whole process at a point before construction. Unlike other hypothesized robot simulation activities, this one is based on the sure knowledge that the target points will be identifiable within any given practical accuracy range because only highly well defined targets are utilized which are at sufficiently precise locations to the data bases of the part or fixture to assure success.

As shown in FIG. 2, simulation routine 02 begins with design part box 104 which takes account of the design data of the part, including any special points (if any). Next, from this data, target points are designated on the part as shown in box 106. The operational parameters are then specified as indicated by box 108. These parameters include camera-processor types, type of robot(s), distances, range of possible orientations, tracking algorithms used, photogrammetric algorithms used, special target indicators, and the like. Using the operational parameters selected, an operation such as assembling or handling is tried as shown by box 110. The results of this "try" are then determined as indicated by box 112. These results are such things as cycle time, functionality, etc. Depending on the results obtained, various parameters are varied in an effort to improve the process as shown by box 114. Among the parameters which might be varied are the following: change equations, redesign part, change target points, apply special targets, add light sources, and add front end processor.

After the appropriate parameters are varied, the operation is again tried as indicated by box 116. If not successful, the parameters are again varied and the operation rerun until a successful operation is achieved. At this point, the operation is ready to be integrated with other operations as indicated by box 118. It should be noted that CAD system 100 would have ideally programmed the parameter (speed, accuracy, risk etc.) of various target choices to be seen using various camera lighting, image processing, and the like.

In addition, simulation 102 can continually optimize the solutions of the photogrammetric target equations to allow the best performance accuracies to be obtained within the desired cycle time of the operation. For example, the target choice and location, number of targets etc., can be changed on a CAD system and operation of the process using robots interacting with these targets simulated and photogrammetric and/or tracking equations optimized.

A simulation block diagram is shown in FIG. 2. With the system, it becomes cost effective to develop simulation programs for robot systems since one has an assurety of vision based guidance. This is not true with other guidance systems in operation today, and particularly not so with those capable of the high speed accurate operation required to justify cost in modern manufacturing.

Figure 3A:
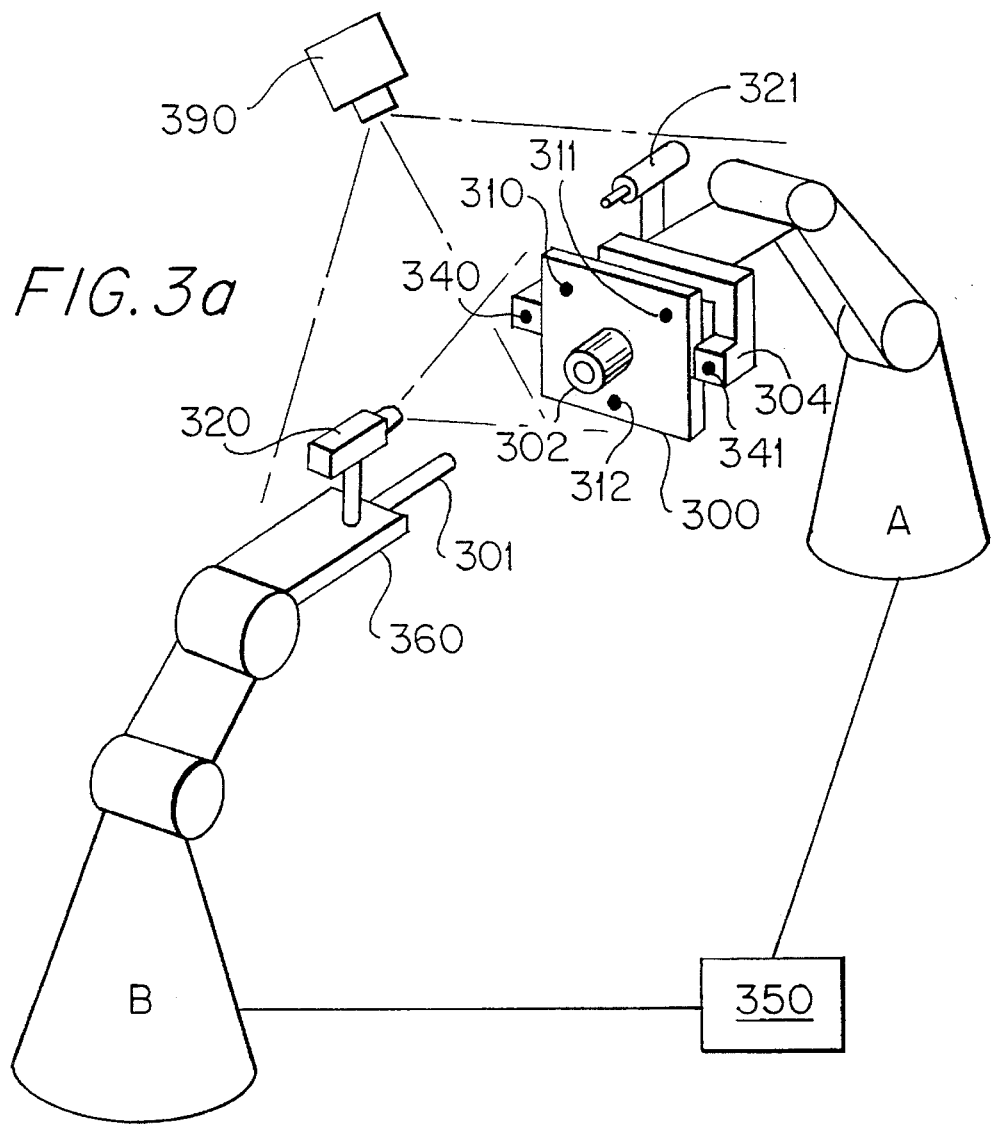

FIG. 3a illustrates a variation on this particular embodiment in which a dual set of robots is used. In this case, Robot A picks up the part 300 and presents it to Robot B which then inserts a shaft part 301 into a sleeve 302 in part 300. This assembly operation could be any other type of operation as well.

Part 300 is picked up by the robot gripper 304, preferably, but not necessarily, using target points 310, 311, and 312 on part 300 viewed by camera 321. When it is presented to part 301, the second robot can interact in any one of several ways. In the first case, the part 300 has target points that can be identified such as holes or other purposely placed targets that can be identified relative to it. In this case, the camera unit 320 on Robot B can home in on those points. Again, as before, all of this data can be downloaded from a central computer 350.

Another possibility is to target the Robot A end effector or tooling 304 holding the part 300, as shown with targets 340 and 341. Since part 300 has been picked up originally in an accurate manner relative to the tooling 304, the tooling 304 then can act as the data base to provide the target data points for the second Robot B. This is particularly true since these target data points can be idealized targets comprising retro reflective material or active fiber illumination which are almost perfect in the ability to be accurately judged. Thus, minimal stackup error due to this transfer of location data occurs.

It is noted that the camera 321 on Robot A can "home-in" on targeted tooling plate 360 on Robot B having 3 targets as shown while the camera on Robot B can look at tooling 304 on robot A. Each one can thus home in on the other.

Figure 3B:
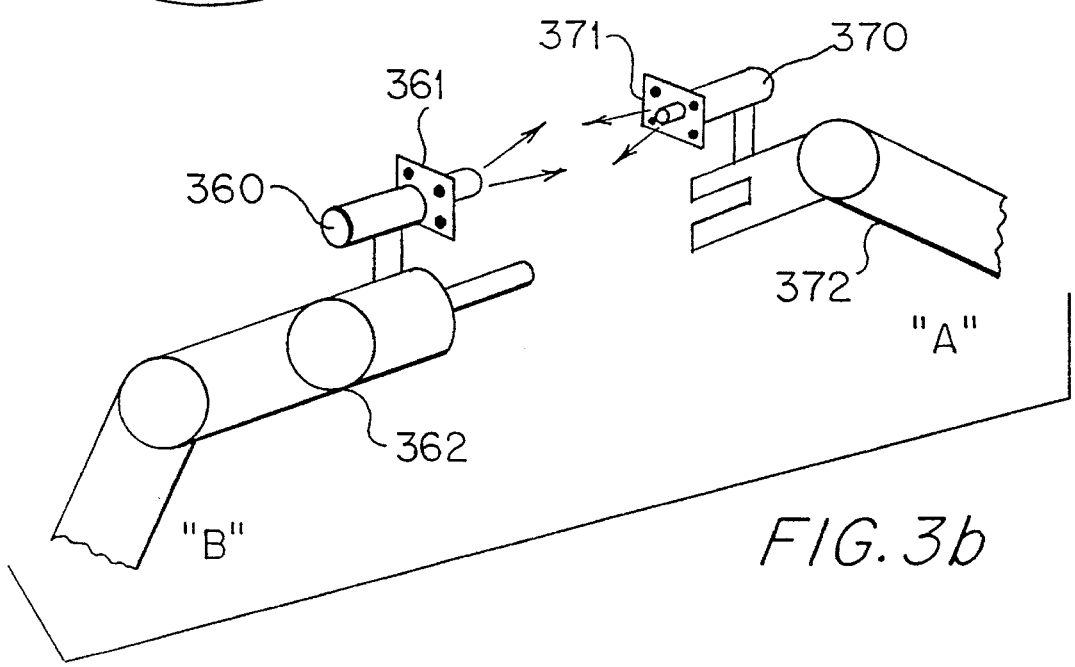

This ability of Robots A and B to look at each other is illustrated in FIG. 3b. A targeted plate 361 surrounding camera 360 is attached to robot arm 362, while a similar targeted plate 371 is adjacent camera 370 on robot arm 372.

Note that robot arm 372 could, for example, be instead a fixed structure such as a drill or router unit with camera 360 (or 370) homing the robot arm 362 in on it with a part in its gripper using targeted plate 371 (or 361).

A third possibility is to target both robots in a manner visible from above (or elsewhere) and use an overhead camera system 390 to monitor the closing target conditions of one to the other. This is schematically shown in FIG. 3a.

Another version is a front/back target situation where control transfer is made between target sets on a part. A part can be picked up (say by robot A) based on targets on one side, and presented to a camera on robot B whose camera locks in on targets on the other side.

Figure 4A:
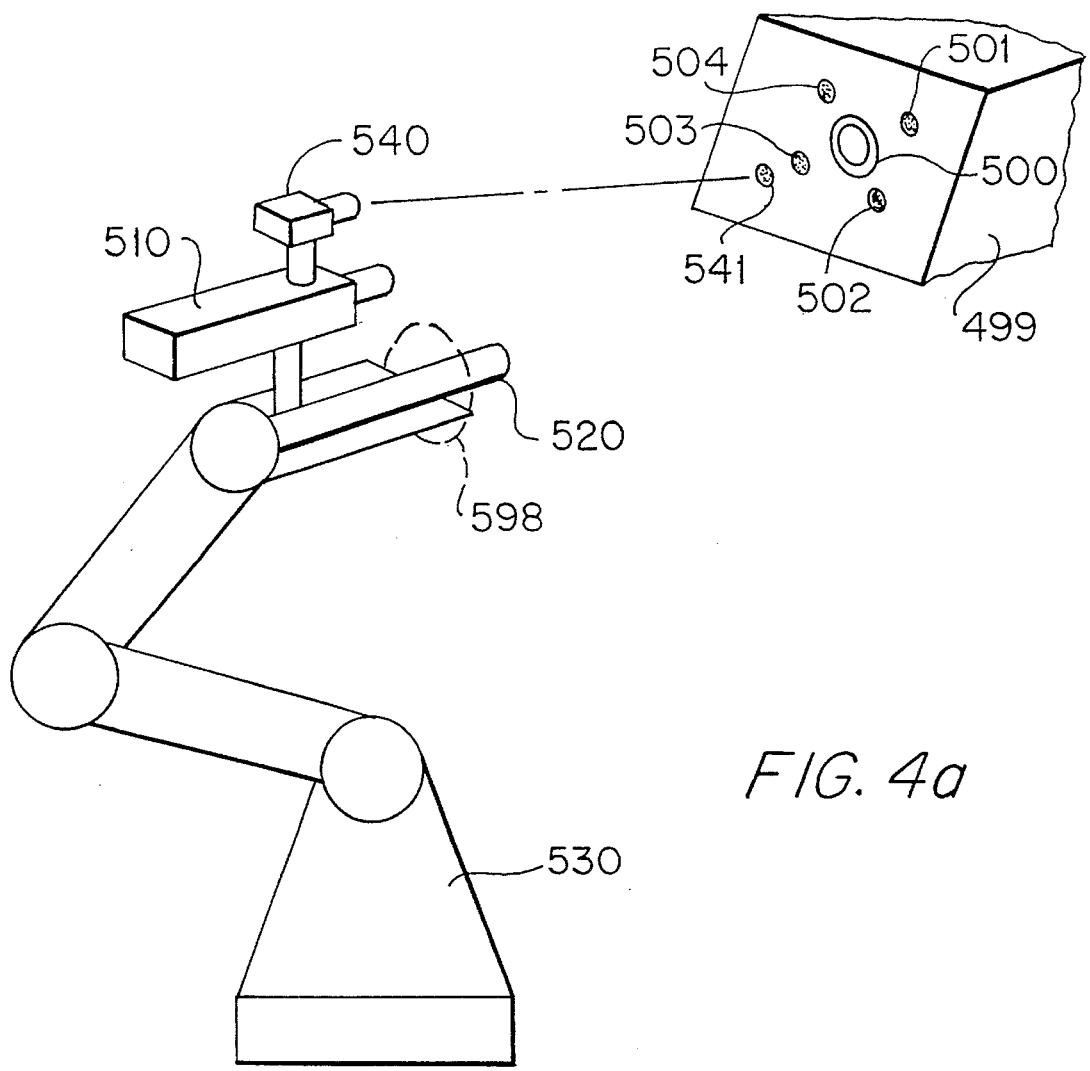
FIGS. 4a and 4b schematically illustrate, respectively, an assembly technique using targets which surround an opening and targets which are covered up by other parts or assembled to point the targets away from view.

FIG. 4a illustrates a robotic arrangement for putting parts into holes or other openings. The area around the hole 500 in part 499 is targeted with targets 501, 502, 503 and 504. Typically 3 or more targets are utilized to allow the total 6 degree of freedom approach to the holes to be made. In this example, the camera 510 on robot 530 senses the target points 501, 502, 503 and 504, and knowing their locational relationships to the hole 500 and its centerline, guides the part 520 such as a pin into hole 500.

TV camera 510 can be located on the robot arm, or elsewhere. The camera sensor unit may also be augmented by triangulation sensors using a diode laser or other light source 540 to project the laser spot 541 or other zones onto the part to further aid the guidance. Such spots or zones can also be viewed by the same camera 510.

The targets around the hole can be anything suitable. For example, on a cast iron block or a cast aluminum block, these can be cast in indentations, raised areas, etc. perhaps with special signatures (e.g. triangles, stars, etc.) to allow their easy acquisition. A variety of other possibilities are also in order. The lighting for such targets is usually provided by a source on the robot arm although the maximum contrast, indented, or raised targets should be sometimes lit at an angle (see copending application reference 1 on lighting for robot applications.)

The particular opening can be any opening, not just a hole. For example, the points at which a gas tank lid is to be placed onto the side of a car rear quarter panel could be used. In this case, the target points might be painted onto the body side outer surface, or other inner points, which would be covered up by the lid.

In this general case, the target points on the surface are covered up after the part is assembled on the shaft by the part. This way they are removed from aesthetic considerations. There are numerous examples where the object involved can be used to cover up the target points that were first used to find the 6 degree of freedom or multi degree of freedom location of the object.

For example, consider FIG. 4a where the part could be a radio knob with a disc 598 (dotted lines) on a shaft 520. When assembled into hole 501 in dashboard 499, disc 598 covers up targets 500–504.

It is noted that hole 500 in FIG. 4a could also be a protrusion like a shaft, stud, etc., assembly to which also requires multi degree of freedom guidance.

Figure 4B:
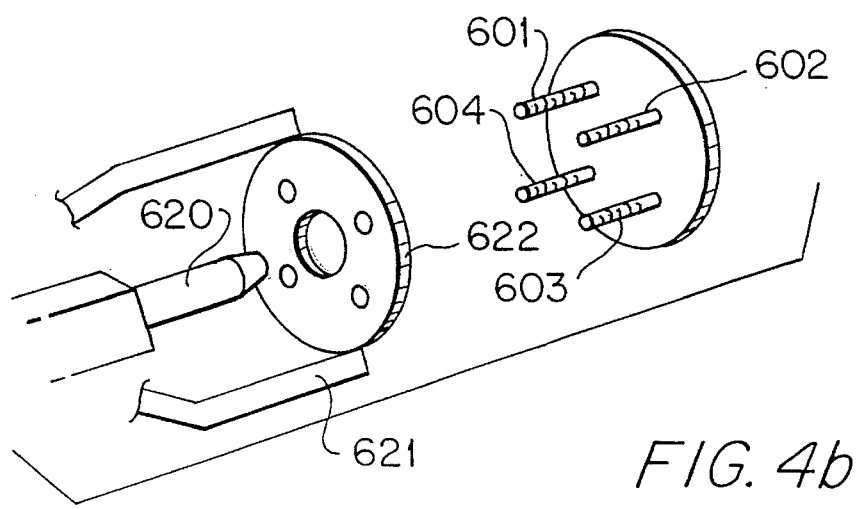

Target points can be located on the end of protruding objects as well. For example, it is often necessary to insert something with multiple holes onto multiple pins (or vice versa). This is the case of wheel bolts on a car. In this case, illustrated in FIG. 4b, the targets are the ends of the wheel bolts 601, 602, 603 and 604 which are suitably targeted according to the invention, for example, with reflective paint. Conveniently, the camera 620 can be mounted in the tooling 621 holding the wheel 622 so as to look through the wheel at the bolt ends.

Another example of targets which can be camouflaged is the use of targets on the back side of an object as was illustrated in FIG. 1. In this case, it is desired for example to assemble a part which has been targeted for ease of manipulation to another part. The targets in this case are purposely chosen to be on the inside when the assembly is complete.

For example, let us consider a process where a robot utilized for assembling a house is used. The robot picks up targeted board lumber which is targeted on its back face with the target points, or what will be the back face in the home. Th back face is then presented by this first robot to a second robot which nails the board to other boards that have already been assembled. The assembly is done in such a manner that the target points that have been used are mounted on the inside. Indeed, this works out quite well since the robot can also look at target points on the outside of the rest of the structure and determine from them the location to place this first part over same. As the structure is totally assembled, all targets end up pointing inside (or are covered up). This allows the use of such targets without creating aesthetic problems on the outside.

This coverup was shown relative to the radio knob in FIG. 4a but also would be the case here on the inside where one would cover it up later with wallboard.

Figure 5:
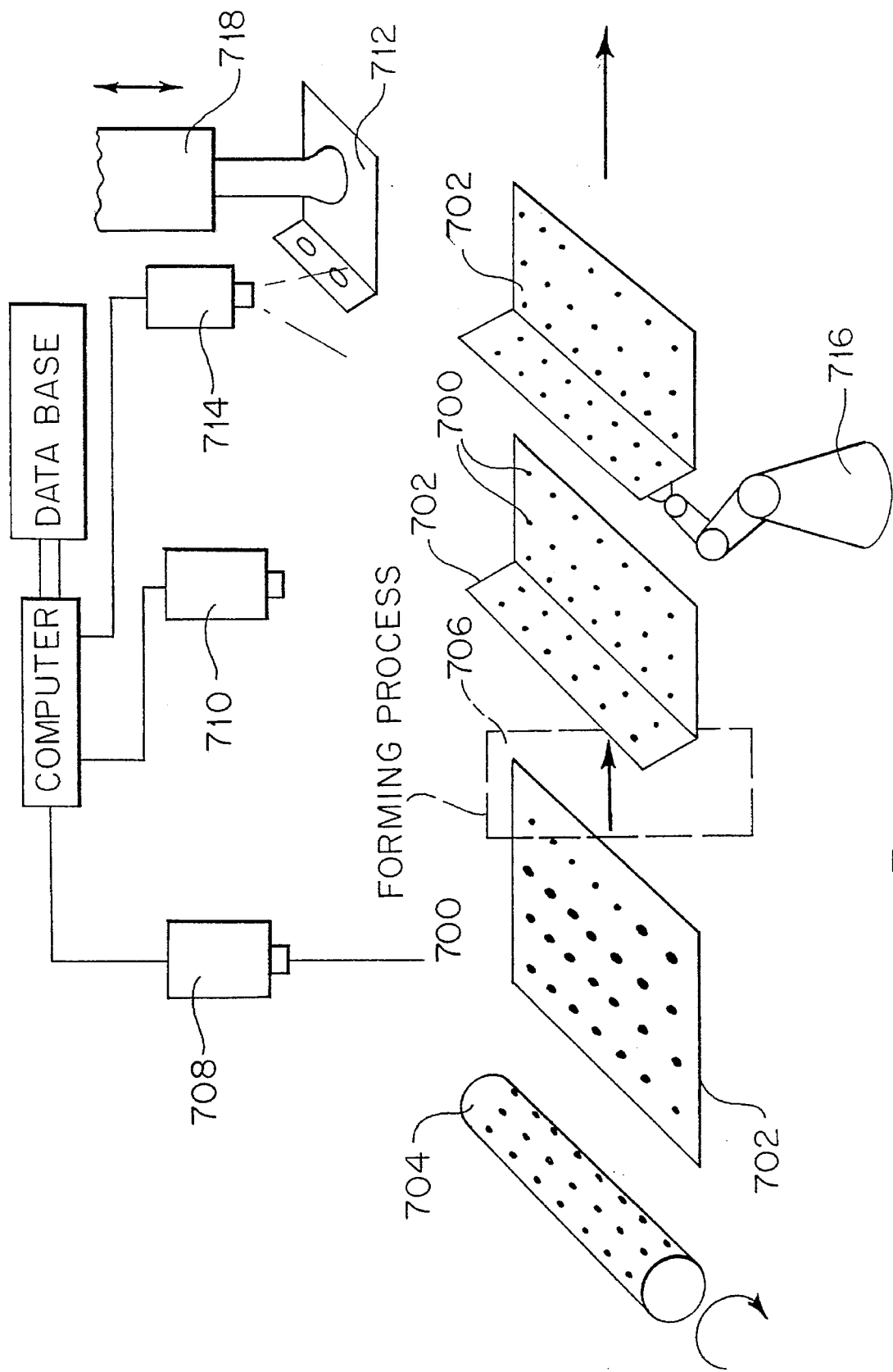
FIG. 5 schematically illustrates transformation of target data bases due to forming.

Consider now FIG. 5 which illustrates the use of target points 700 all over a structure 702 and particularly on formed parts. The intent here is twofold. The first is to deduce from the changes in the target pattern the effects of forming on the part 702. For example, it may be desired to obtain the new dimensional shape of the part 702 using the data base now resulting from the forming process 706 and any strains or any in-plane deflections which may have occured as a result of the forming or welding process, etc. This can be used to control the process 706 as well as feed data forward as to the new shape for further robotic assembly.

For example, consider the case of metal body panels or aircraft panels. They start out as steel blanks 702 which can be imprinted with a dot target pattern on one inch centers throughout the total width. The targets 700 can be rather precisely applied, or if not, can be initially monitored by a camera means 708 to discern what the pattern is. Such applications could be through a roll coat 704, an etch process, or the like.

This sheet of steel 702 is then formed into a new form such as a car door or, in a more simpler case, a deck lid. It is now desirable to use those target points 700 as viewed by camera means 710 which have now changed their form to determine any irregularities of the forming process as well as to establish the new data base for the part. Where this data base (namely shape and so forth) is a known desired one as it is in the case of a door, one would then like to compare the desired data with that resulting from the new pattern. Furthermore, this new data base can be utilized in the actual handling of the part between stations of a press line, for example, as long as it is known what to anticipate in terms of what it is. Indeed, it is noted that rather than putting down a roll coated impression every one inch at squares on the initially formed blank, one can actually roll coat down a series of dots of other target points which make a square pattern when optimally formed.

Now, take this case one step further, where a formed part 702 such as a deck lid has dot points 700 on it. This formed part is then to have a part 712 welded to its rear by spot weld robot 716, which part 712 is the inner stiffner of the deck lid. The dots 700 are viewed by a camera means 714 and not only used in the handling process of handler 718 to move this part 712 into place also using camera means 714, but also to position the welded inner part 12 relative to part 702. These dots are furthermore used to check after welding whether or not certain distortions have occured beyond limits in the welding process and to establish the new data base for the part.

If new data base is satisfactory, the part is moved on by a suitable camera equipped handling robot to shipping or to the body build process. In this process, this formed part is mated up with other parts and again the target points 700 can be used in this mating, for example, in putting the deck lid into a deck lid opening.

In the case of doors, it is particularly important because the door is loaded with hardware and then hung from hinges which can tend to further distort the door. Indeed, if all the formed parts were made up and targeted in such a manner, it would make the job much easier for the automation and inspection through the total build of the part. This concept goes well beyond formed parts, to all types of things. However, formed parts are the ones in which the most distortion can occur.

In the final operations, the etched on or painted inked on marks, etc., if on the outside of the car, are generally painted over or otherwise removed. Naturally when such marks occur on the inner portions of the metal, no aesthetic problem exists.

This process is particularly applicable to formed metal which can spring back and generally has a relatively unknown shape such that errors in target point locations are not severe relative to the accuracy of the metal.

Another process that is somewhat similar is casting which is a relatively loose process on the same tolerance level as the forming. Plastic molding is another with the same tolerance but unfortunately this generally does not lead to distortion except during perhaps glueing operations. In any of these cases, suitable target points can be molded in, cast in, etched on, burned on as with lasers, or any suitable means can be utilized.

One can also use an absolute encoded target pattern, one which has no ambiguity as to where each target is. This could be with clusters of targets on different centers or patterns, different shaped targets, or the like.

It has been noted that this process is most applicable where more operations occur to a given part that can change its shape and where the part is more likely to change shape as a result of the operation (as in springback). This means that the roll forming, hydroforming, press forming, press brake forming and other forming operations done in the automobile, aircraft, and offroad vehicle industry, particularly are natural users of such technology. By judicious choice of targets and their applications, one can utilize these targets throughout the process for material handling assembly and inspection purposes and generally effect large cost reductions in the manufacturing as well as improve greatly the flexibility with which such manufacturing can occur.

The target application techniques can be whatever is suitable. As is obvious, the closer to a flat blank that the targets can be applied in, the better from the purpose of target application as long as those targets through the forming process can maintain their legibility.

Speaking of legibility, the typical technique is to utilize a solid state TV camera to look at the target points. This has proved satisfactory, for example, to look at etched lines on die blanks in press forming.

While target points on the formed materials and other shapes are considered here mainly in the light of formed steel stampings, aluminum graphite epoxy and other formed parts, one can actually extrapolate this to all types of structures and parts such as, for example: plywood on buildings, concrete which sets and takes a shape and then might later be used for further operations, ground (earth) as in targeting points on the ground which would then be used later on to guide particular items even though the ground had shifted or was distorted by working around it, and the like. Indeed, it is the general case that if one can get targets onto the surface of structural parts or other objects in their original form before any further work and if those targets stay on those parts throughout the work, then they can be used the maximum number of times and therefore increase the cost justification of the targeting concept. For targeting on concrete, targets such as glass beads, dot targets, or cats eye retro reflectors could be actually inserted into the material where they would harden therein and still be visible from the outside. These, of course, are idealized targets. Others would simply be little dots, points, or even non-circular targets. In fact, non circular ones could be advantageous from the point of view of absolute target coding. However, in general, circular targets are desirable.

One must consider the integration of all these target concepts. For example, discussed above is targeting the points in their bare form and looking at a changing data base for the part as it goes through the various forming and joining operations. Also discussed was designing the part in the computer with the targets present thereon, the targets being in this case either special targets or normally appearing portions of the part or both on any one part or on any grouping of parts.

In other copending applications such as those referenced above in the Background section, other systems for targeting the work area of robots and automation of guiding vehicles and other target functions are performed. The operation too of the various vehicles and robots can be simulated in the computer relative to these target points as well. Again, a key item is that with target points one is much more assured of accurate reliable operation and therefore the justification for such simulation and expense thereof is paid back by the surety of the function of the final simulated structure. And too, one is dealing with mathematical representations of target points and photogrammetric equations, not relatively unknown functions of vision systems with gray level images of object features. Simulation of dynamic target tracking also become feasible as the problem is much more defined than with gray level scene analysis. This also leads to faster assembly and more justification.

One can indeed state that the whole work area and work environment of automation in the factory of the future could well be targeted. All the parts, the fixtures, the jigs, the tooling, the robot worked areas, the passageways and areas of travel of automated guided vehicles carrying the parts, the transfer conveyers, even belts on which the parts ride could be targeted. With such target data stored in the data base of a master control computer for any one cell or an overall host computer, one has complete control of the environment. Everything is known relative to known target points such as: the location of the automation, part, the part shape, material handling, bringing the part and taking it away, relationship of other parts to the part, and the like. The data relative to this information can be manipulated in the computer and optimum operations derived such as trajectories of robots, forming, and the like. It is considered within the purview of this invention to integrate these functions to the maximum extent possible to where flexibility s attained while still having complete control over the operation.

Figure 6:
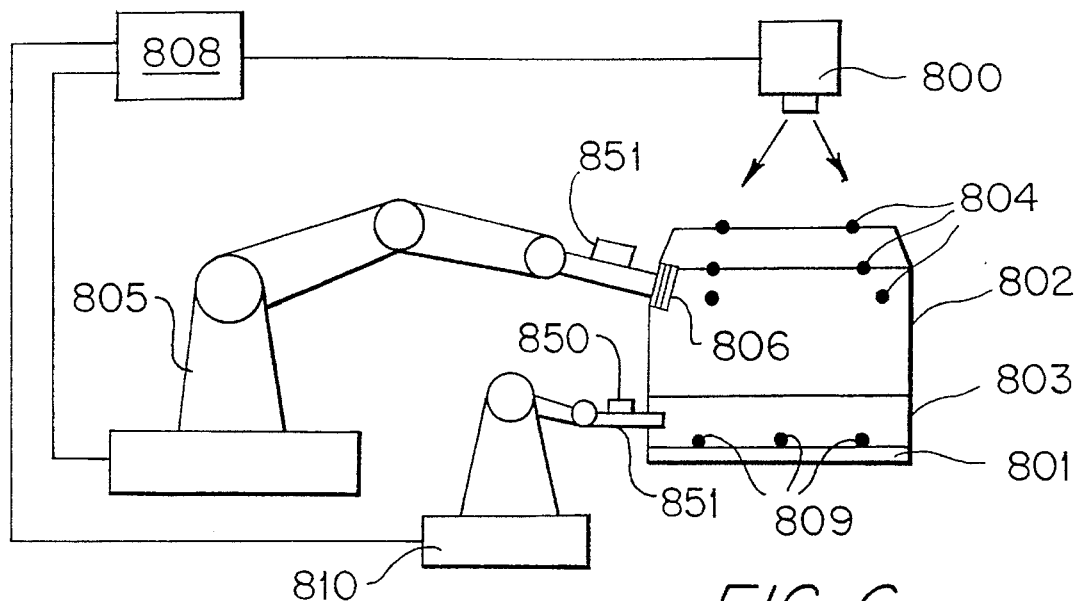
FIG. 6 schematically illustrates flexible "fixtureless" robotic assembly.

FIG. 6 illustrates robotic fixtureless assembly using targets and further illustrates the concept of dynamic target location to adjust holding or welding robots dynamically under target control in response to forces (clamping, welding) tending to change the part from its correct shape.

As shown, car cowl 802 is to be welded to flange 803 of underbody 801, under control of at least one target sensing camera 800. Camera 800 senses various targets 804 on cowl 802 and targets 809 on underbody 801 itself. The sensed data is then fed to computer 808 which is connected to holding robot 805 and welding robot 810.

Robot 805 has gripper 806 holding cowl 802 in place and having target plate 807 observable by camera 800. Robot 810 has spot weld gun 851 putting flange to cowl welds on, with target plate 850 also observable by camera 800.

The holding robot 805 is moved into position to the correct location determined by cowl 802 and underbody target location and the weld commenced. If distortions occur moving any part to a wrong position, the holding robot 805 and welding robot 810 acting in concert under control of computer 808 move to correct them. Typically, a plurality of welding and holding robots would be utilized. Some non-adjustable or non-programmable clamping or welding could also be used in conjunction.

The target's data base provides reliable accurate control over this operation and allows instant feedback correction. The procedure is flexible and could be programmed for any operation or car line. Typically, several cameras looking from different views would be required on a complex structure.

Note that when such a fabrication cell or an assembly cell is fixed all in one spot (no moving conveyors), the camera computer 808 can memorize the position of each of the pieces in build up, from its targets, even though they are later covered or partially covered up. For example, when cowl 802 is positioned to underbody 801, computer 808 records the position of underbody 801. Then, after cowl 802 has been welded to underbody 801, computer 808 again records its position. As a next step, computer 808 could guide A-pillars in each side from their targets relative to the recorded cowl position (and if desired, considering underbody 801, too).

For example, one might purposely slightly change the A-pillar locations relative to the cowl if another body portion mating to the A-pillar was related more to underbody position. This avoids stackup of errors. This really is a major advance in that it accounts for weld distortion—you can measure and correct while welding and after weld you know the final location.

Correction of distortion or stack up of tolerances in real time is absolutely a major advance. This would apply to adhesive bonding, riveting and other joining processes as well.

The term "TV Camera" in the invention generally connotes a dimensionally stable type, such as a solid state TV camera, e.g. a GE TN2500. However, other means for electronic imaging can be used such as Vidicons, image disectors, linear arrays and the like. Indeed, a mechanically scanned laser beam, like a flying spot scanner, can be used to sweep through space in order to find target points some of which envisioned could be particularly reflective or responsive to laser light. The primary goal is to find target points or features. However, the TV cameras also allow normal gray level part images to be obtained, a big seconday advantage since this is often combined with the target based guidance function for inspection, recognition or other purposes.

A suitable target sensing vision system is that described in the prior copending applications noted above, and it is noted that the design program on the computer aided design system should be able to design the type of location of these targets which are suitable for the vision system.

The laying in of the targets could be by specifying operations which put the targets on as special items, i.e. by spraying them on, sticking them on, or drilling special holes or the like. The other idea is to use the CAD system to design the part, and then to look at the part as designed in its functional way. Drawing upon the knowledge of what can constitute a natural target (as in a naturally occuring hole or corner), suitable targets are specified. A computer program can be used, if desired, to augment the decision as to which natural targets are the targets to be used.

The beauty of the computer design system then would be to allow you to "try out" the design with a hypothetical target set using a typical simulation program for a RPS (or other target determining camera system) equipped robot.

Suppose one would wish to design an operation where a sheet metal door inner which is full of holes is to be attached to an outer panel by welding. One robot holds the outer, one holds the inner. The robot grabbing for the inner would use a camera system located on its end effector (or near its end effector) and guide the robot in using certain holes on the inner panel as the targets. The CAD system program would be designed in such a way as to allow a three dimensional simulation of the robot's movement to be made, and to determine the robot cycle time which would be achieveable in the accuracies of position using those targets. This would be done by working through the known accuracies of the camera system, and the photogrammetric equations could also be utilized (which would be called upon from memory) and the whole system designed on the CAD system. The other robot picking up the door outer would work in a similar way, and other points on the door outer that could be picked up would be monitored and the total assembly predicted using the control equations of the two robots.

Each operation involving a particular part that might go through a line could then be tracked. For example, now that the inner and outer track are assembled, the assembly could also be sensed from the holes on the inner or other features in the operation of putting the door onto the car. This too could be automatically tried out on the computer.

The key here is that the target type solution allows us to quantify everything. Every single possibility can be predicted by mathematical equations which can be put into a simulation program used to try out designs.

One key advantage obviously is that if the whole operation is not fast enough or accurate enough, other types of targets might be specified than certain naturally occuring ones. One would then know that in planning the line layout for this operation, and one might have to use two robots per operation instead of one, etc. All of this could be known in advance.

Also, the CAD system could design the way in which the different stations interact on a line. For example, certain targets might be covered up by assembly operations and alternate targets would have to be used. Indeed, complete alternate strategies in case certain targets were missing could also be programmed into the CAD system and the whole design checked out so that such targets were present in the initial CAD design part.

The assembly operations usually require the build up of components on targeted tooling which is used to hold the portions in place while other components are added. If such tooling is targeted, the location and precision of the robots, etc. doing the assembly can be vastly reduced.

We should consider the problem of assembly with and without tooling plates. In one case, where the robot holds the part to be assembled, the other robot assembles another part to it having a target. Perhaps even the first robot's gripper is targeted, which in essence then is a programmable tooling plate. In fact, changeable grippers can be used, as can changeable tooling plates, all with targets to facilitate their changing.

Continuing the ideas of these RPS things, it is not just usable on tooling fixtures for assembly. It is also welding or any other kind of fixtured operation where one would put the object onto the tooling and then add another object to it. Any sort of holding fixture will do. Again, another robot (if it is still enough to act as the fixture on the other side) can be used assuming the part is targeted.

Also covered in this case is the concept of covering up targets on an object when the object is assembled to it. For example, a radio knob attached to a targeted radio front plate with targets around the knob post would be suitable. Also suitable is the assembly of a tail light bezel to a car with targets around the attachment points.

For example, if everything could be put together from the targets in a static location, this would be most advantageous. Also desirable is to only move the part or whatever simply to 2 or 3 such static locations. For example, right now instrument panels are put together on a continuous line where they go around a continuous loop with maybe 16, 20, or 25 people standing in the loop assembling all clusters etc. into the instrument panel.

Figure 7:
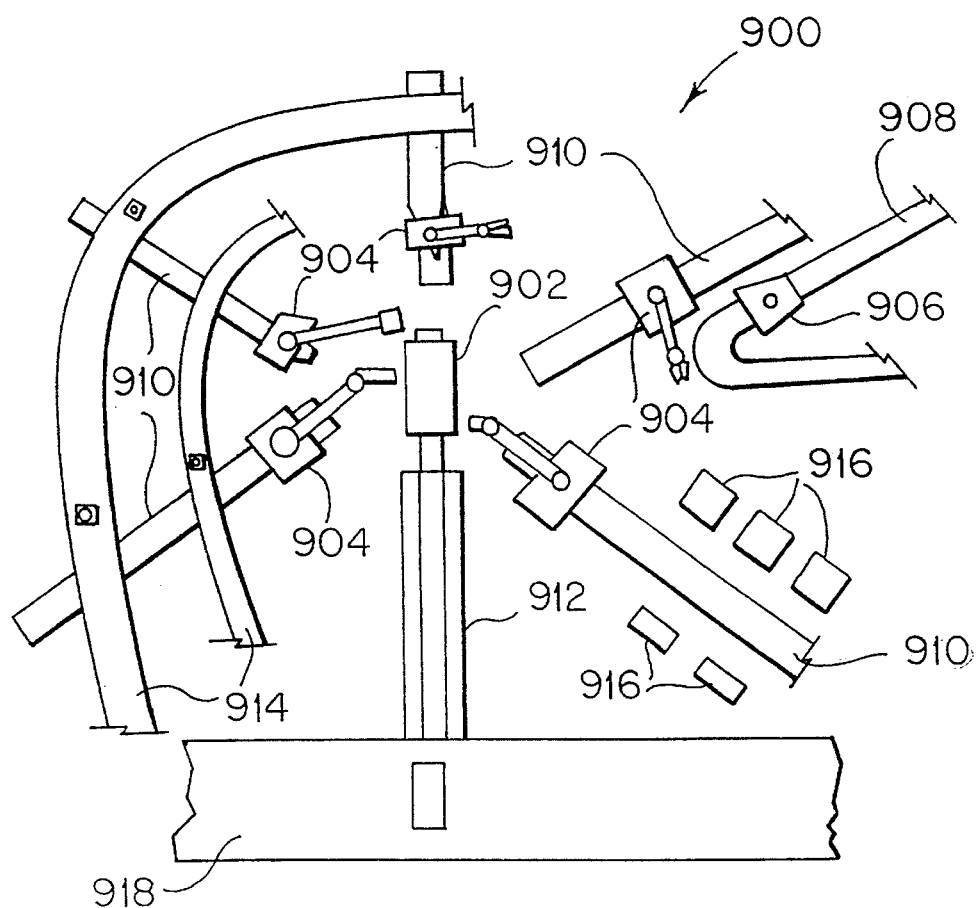
FIG. 7 schematically illustrates an assembly cell according to the invention.

Assuming that the problem of the wiring could be solved in an instrument panel line, one might replace this with a single fixed panel. FIG. 7 shows a fixed assembly cell 900 for an instrument panel, engine, or other component 902 into which would be placed all of the various items by one, two, or more robots 904 going out and grabbing them from different containers 916 located nearby. There are certain advantages to cell 900, namely that one does not have to deal with a moving line and that everything is fixed (which means the highest placement accuracy that could be expected.) In this condition, one would have to be able to pick out all the different parts. There might be 20 to 25 parts required for the panel, plus the multiplicity of different versions of the same thing, which might lead to a total of 100 different choices with the robot. This would require either very well positioned parts or a good vision system, and the targets would make it quite easy to do both fast and accurately.

Speed and accuracy would be paramount because if this system could not go fast, it cannot possibly compete with humans on a moving line.

Most of the parts of the instrument panel or engine 902 as shown in FIG. 7 could have targets on them, which could be made to seem like the existing parts of the panel or engine 902 (which have lettering on them or certain points or corners and holes). These are all already present in abundance on a panel or engine 902, for example. In addition, knobs on the panel can be used to cover up targets and other whole assemblies can cover up the targets on the inside of the panel which would be used to guide it in.

The central problem with this then may not be the targets at all but the tooling. If a universal robot is utilized, the robot might have to have different end effector tooling and thereby lose cycle time changing it. Such a robotic work cell is thus very appealing. However, parts would have to be brought in when they ran out from outside the periphery of the cell. In other words, what is essentially parts trains 906 would come in on tracks 908 or 914, just like tracks into a roundhouse.

With a car body, clearly the body in the first place is made up of a large number of panels welded together. This is done in-line, and at each station a varying piece is brought in, fixtured and the car body welded up. This could conceivably be done without the fixtures using targets.

For example, suppose we wish to build a car body up from scratch. We could take stampings that comprise the side of the car, e.g., start first with the cowl and the A-pillar and assume that the cowl is welded to some sub-frame. The A-pillar could be brought in using targets on the cowl and targets on the A-pillar. The A-pillar would be accurately picked up and placed by the robot on the cowl where it would then be welded once it was in place. The accuracy of the positioning would be taken from the targets on the car, not from a fixture.

Satisfactory target accuracy could be achieved with an A-pillar roughly 2 ft. long welded to a body cowl. This piece should be accurately positioned within +/−10 thousandths. Whether it is, in practice, is debatable however. First, one would figure out just what the target error is to do this. In any case, with one robot holding the part per the camera unit (which would now be not on the robot at all but off to the side so that it can get the true reference of the A-pillar to the cowl), another robot comes in and welds it. This can be done with dynamic correction, if necessary, by the first robot for position due to distortion by the welding robot. This could be called "fabrication method with dynamic real time target location".

After putting on the A-pillar, one could then go over and put on the other A-pillar, so that one could come in the body side. Indeed, all of the parts could be welded on this way, particularly those internal ones. This is really just like a completely flexible fixture. With different programs foe different parts, one could make anything.

Using targeted outer parts, you can then drill all of the holes needed from the targets etc. Again, one would have to bring all the parts to it, so that it would then move the finished subassembly out of this cell and bring another one in. Instead of having a continuous line, you would have a relatively few number of stations, relatively widely separated. This would allow, however, different things to be made more easily because on a continuous line, the varying part steps would not match up (although the same technology could apply to that too).

To do an assembly like this, you might have multiple cameras too, one above the whole cell 900 and various ones off to the side coming in from every angle. This would allow you to get a better fix on each of the parts as well as deal with the fact that sometimes you would obscure yourself with the tooling doing the operation.

An interesting thing is a co-target, that is a target that tells where the other targets are. Such a co-target identifies the part and as such tells where the targets are. It also gives the orientation coordinates so that one can find the other targets.

The beauty of this one market idea is that the single market identifies the part and therefore all the targets around it. It could also give an approximate orientation code for the part, which now could include not just a reticle (which was shown in the turbine case noted above) but actual dot code or something from which an accurate orientation in 6 degrees could be created. From that, one can then find the other features of the part that one wishes to use for further use such as the corners, the holes, etc. Therefore, there is a one-step process using that single marker to tell the rest, including where the others are which in turn are then used.

Other kinds of targets include: a serial plate, either just as it is, specially designed, or with print markings; a logo; a bolt head (as mentioned above); and an instruction plate or a bar code marker.

Getting targets on sheet metal can be a problem as lots of sheet metal really does not have any holes in it per s, at least on certain surfaces that one might want to use. In such a case, we can paint targets on those for the assembly operation noted. Marks such as small indentations, ridges, tabs or the like can also be stamped in.

Painting could be done in a stamping fixture coming right out of the press, since the part is trapped anyway usually upside down. It would not take too much to lay it in another fixture and determine target locations. Another possibility would be to actually stamp the target in. This would seem to be impossible on an outer surface unless one stamped on as part of the stamping process something that would essentially come off.

The other obvious place would be in a weld fixture where one clearly welds most panels together with some other panel. Obviously, you cannot replace the weld fixture with a robot and targets if one does this, but at least the assembly of that welded up component to any other could be target automated. Weld fixtures typically also have sensing associated with them to create an in-line check fixture situation. Even this check fixture could actually contain the marking units.

Obviously there are numerous underbody and chassis components that could be targeted without any detrimental aesthetic effects—mufflers, tail pipes, brackets, clamps, tie rods, steering parts, etc. These are obviously labor prone things to assemble and one could envision robots working underneath the car while the other work is going on above in the assembly function. This is, of course, very tiring work for people and therefore would be well set up to robots. There is no reason why the whole operation could not be up above the floor. The car is brought in overhead with some robots on a second tier and other ones underneath.

This system should be usable in a variety of circumstances, such as: components that are all assembled to the body in the trim area including tail lights, glass, front, rear, wheels, headlights, grill, door handles, rear view mirrors, antennas; internal assembly components such as door assembly, lift mechanisms, trim, and instrument assembly covered above; and underhood assembly (this too probably can be marked up in any way desired with no detriment).

Note that another type of marking, purely decorative, is trim decals which could be judiciously chosen as targets.

So far all target sensing development is based on a raster scan camera. These, therefore, were generating windows, tracking, etc. Other types of special cameras might be interesting for this application. For example, if one always has 4 targets you could have literally 4 image chips with 4 separate scans of the field which would then simplify the processing. In addition, one really does not need all the number of lines that there are in a field if one uses targets that occupy large portions of the field. Therefore, a camera having 10 vertical lines and 10 horizontal lines widely spaced might be quite suitable. Instead of scanning say 300 lines with a camera, you would then scan only 20, but this would presumably be sufficient. This would require a target design that was able to be cut at multiple points and give the right answer. Naturally, the speed of response of this would be quite a bit higher.

A polar scan swept like a radar screen is also possible. Although these are not widely available, one could assume some future value.

One of the beauties of putting targets on the A-pillar, etc. is that the fixture can actually slip, and dynamic correction be made via the high speed of response to the target position.

One would also expect that you would have to have 3 or 4 targets to go along with all of this or else you could not do it. The other thing is that you would certainly want to have redundant targets in case some of them were knocked off or the paint gun did not work, or whatever.

One can also come up with a plan for automating the way in which the parts are brought in. Targeted little trucks would be provided that instead of having fixed tracks can actually reposition themselves at different locations, either in the horizontal plane or even vertically, to be grabbed by the robot. This ability to have them at multiple different planes with a very high reaching robot and targets-also allows floor space to be conserved. Indeed, another robot could be used to load the parts into the racks from the targets out of the dunnage. In that case, therefore, the parts would be presented to the assembly robot in a better orientation while still targeted, possibly saving some assembly time. The other unload robot then would be used to essentially deal with the messy conditions.

From the above, it appears that all things can be made from targets. If robots can accurately position and are structurally stiff enough to withstand the forces of welding, drilling, or whatever (and this is not quite sure), then presumably all things can be made this way. However, some things apparently cannot. For example, if one has to back up a drill, this can be done with a robot in some cases, but not in other cases.

In a structure such as this, important considerations would be: where the cameras would be located, what kind of robots would be utilized, would it be better to have more than one robot holding each part or clusters of parts, etc. Particularly, the concentration should be on the target orientations and the cameras or the like.

As noted above, the following are parts of the car in which, the theory, targets would mean very little in terms of their add-on aesthetic value: under hood, under carriage, when covered up by something else as in seats over bottom part, inside door covered by trim, inside of tail light covered by light, grill covering other part, etc., inside trunk only to a degree. Those are the main areas, but they may constitute at least half of all the assembly work, if not considerably more (in fact, much more).

The other thing to be considered is can the body structure be built up with targets and then the targets taken off. This seems logical. Every weld fixture of every panel can be a place for target application.

Incidentally, there are people talking about painting the whole car after it is assembled, not just sticking painted doors on. That would of course make the job even easier. Then everything is targeted going in and you just paint over them.

If parts are targeted, then obviously, an RPS equipped robot can pick up a part in a very well known way. Assuming that the gripper is correct for this, it can then (within the accuracy of the robot itself, which also could be RPS controlled) present this par to another robot in a well positioned manner. Ostensibly, the accuracy of this position could be just as accurate as if it would be fixtured, assuming that the fixturing details and the RPS were equal in accuracy. The only problem would be the inherent inaccuracy of the robot.

However, it should be noted there is nothing to keep the second robot used to assemble something onto it from using targets as well, therefore taking out that positional error. Conversely, the targets utilized by the second robot could be on the first robot as on its gripper. In other words, if the first robot grabs the part in a known way, the second robot only needs to home in on the first one, not on the part. This could make it a lot simpler for an assembly operation. A very clear-cut target board could be utilized on the gripper or somewhere on the end of arm toolings that would be directly relatable in a known way.

This two robot assembly is very similar to the human using his two hands, one to hold the first part and one to hold the second, and indeed a twin armed robot could be considered for the job as well. It is more arms and hands than it is robots per se, although they have to be separately controllable.

It is however interesting to note that the inherent accuracy of the position is considerably higher than for a human. The human, if there are no marks on part at all, would have a great deal of difficulty for example, drilling three precise holes exactly positioned in a location. The human himself would need some kind of fixture as in a template or something. Wherein in this case, the targets actually provide that since they are carried on the part. They can be on there in a way that a human would not be able to directly relate to in an easy manner. The advantages over humans are noted.

There is a special assembly technique that lends itself to this. One clear-cut aspect is targeting parts in unobstrusive zones, as on the back side away from the observer. For example, a radio knob on which the back of the knob had the targets or a door handle of a car in which the inner door panel was targeted (this is almost a natural case anyhow since it is full of holes which can be used as targets). If we then use one robot to grab at the inner side where the targets are present, we can then assemble the outer side which might be a visible one onto something.

The outer is usually the part you would like to grip so that you could assemble it to something else like the shaft on a knob or the body on a car. This is not easy to do if the targets are on the inner. What is more straightforward, therefore, is to use the targets on an item that it is to be assembled onto as in around the shaft or around where the door goes (the opening).

One possible way to do this is to have 'U' shaped tooling where it is grabbed on the rear part but held on the front via the 'U'.

One thing is sure, you could take doors that way and use drilled trim things on the outside doing it that way. This is if it all lined up. We might have to do this on the finished car, however, targeting the outside.

One could also grab the part from its targets and then move it over to a drill fixture rather than a second robot. The fixed drill fixture or whatever it is could be different for different cars say—this would of course give it flexibility. The robot would take the part and move it to one of five stations depending on which type it was sensed to be, and then orient itself relative to that station which itself would be targeted.

In the latter example, it is a gang drilling, gang welding or some other multi-position gang operation with multiple points. This would be true of a robot grabbing parts up willy nilly and Just putting them in the right thing. Note however, we are talking about non-fixtured parts in this case. Parts that are not being dropped into a fixture, only presented to a gang drill that itself does not have any fixture locators because the targets have located it.

However, this might not work since in some operations the robot could not hold steady enough and you would have to drop it onto locators. But in other cases, it would just present it to it. The interesting thing about a robot, like a human, is that it could just go to one drill and sequentially drill four holes in a row using the targets to set up the straight line or whatever the other pattern was. This could be totally varient depending on what part it was, without the necessity of building the special gang drilling fixtures. This could be the putting of moldings on, but really it could be anything (even cylinder heads or something else) if one could position accurately enough and hold it, of course.

One obvious thing that you do not have to position ultra accurately is spot weld guns. This would be relatively simple. You could sequentially, using targets, put a part set to a spot welding gun that would then put different spot welds depending on what it was (or glue or anything else like that). Therefore, one robot which would target on the gun that it could aim the part off of, could actually do numerous parts in many ways, all programmably. However, such a robot would obviously not be very fast as it is a one at a time deal. This would be the opposite effect of having gangs of spot weld guns on fixed automation coming in on a part that is transferred through. In this case, a single robot would go make all the welds on a part, and it would be transferred out. It would take many more robots, but that might not be more expensive. You get to optimize the one gun you do have, or any other things such as adhesive sealer or guns or whatever.

The same logic holds for presenting a part that has numerous threaded holes in it to an automatic tapping machine or an automatic nut runner or for that matter taking a nut runner and moving it to different points on a part.

One interesting question is whether all this allows whole other assembly procedures. If you do not need special tooling and fixtures, you could just put a car together by feeding parts to the assembly point such as cell 900 depicted in FIG. 7 just as if a human was going to stand there and build a car in his garage. He would go out and get the parts and bring them in and assemble them up. The advantage of this is that you are moving the parts by conveyors to the build points, rather than the cars to separate build points. The robots 904 are going out getting the parts and coming back.

Robots, for example, could be mounted on slides 910 or for that matter could be gantries themselves. This would look like a round house or something with each of the slides then being fed. However, you still have to get the parts in and out of the system or the finished cars have to be moved as by conveyors 912 and 918.

It does mean that the car as it is built up is fixed in a known place. Thus, each place you do something is dimensionally known from the operation before. This is not true in line type assembly unless elaborate shot pining is taking palce. Therefore, the total build up of the car is a known commodity even if the positions of the parts and the other things feeding into it are unknown.

In this new mode, each of the parts of the car is targeted and as they are laid upon each other the assembly itself becomes targeted insofar as they are not covering up the old pieces. This means that as each robot approaches it can memorize the locations or use the targets. Indeed, the targets on some of the parts as they are positioned offer a chance to update the robot coordinate system so that it can re-memorize the positions in case the robot gets out of sync.

For welding, a robot would bring the parts in from one side, lay them down and the second robot would grab arc welding tooling and weld them all. Such a method that could be totally programmed in a CAD system. This completely relieves having to transfer data to fixture builders, etc., shaking down lines and so on since one can theoretically do this in CAD and you are dealing with minimum numbers of pieces of hardware and delivery time therefore. One robot, perhaps two robots would be working on a single area, each with different sets of tooling that they can use. Different robots might pick up parts from different sides with an overhead gantry type robot as well.

This whole procedure would just keep proceeding until the car was built. Obviously there cannot be much room for parts washers in this type of thing. Instead, the car would be transferred out on conveyors 912 and 918 after the body was welded up to a second location where it would be washed and then transferred in to another similar type station for assembly. In this case, all parts would be brought in from the outside and the assembly built up. One might do this in two stages, assembling the inner parts of the car and then using the assembly robots to go ahead and weld the top on. This type of procedure allows one to completely change ones mind as to how you are making the car. Make it one way one day and another way the next. You do not have an investment in the lines and fixtures. This is really a big advantage.

In order to achieve 60 jobs an hour, you would need 60 such robot cells each putting a car together in an hour for example. A big question is how would you feed the parts to the cells. Note that 60 jobs an hour is a typical number for both body plants and assembly plants but some Japanese run 30. We can take that to be the minimum.

Clearly some sort of very clever material handling would be required in order to get the parts to these individual drops. The simpliest of all, of course, is an overhead monorail conveyor 914 bringing the parts in with the robot simply going over just as the human does in a transmission plant and grabbing off the one it wants in place for its job. This would be by far the cheapest, but would require numerous conveyor loops which might get in the way of each other since we are talking about multiple types of parts coming in at once. The loops might have to go in a circle around the whole operation with the robot moving radially outward from its Job to find the part it wants, grabbing it off and bringing it back.

A second way is to simply have them in racks 916, bring the racks in (as many of the parts are racked anyway) and bring them in with trucks to each of the individual job sites. For example, if each rack contains 16 parts, we can do a day's production with a single rack full at any one cell. The true flexibility of this is a distinct advantage.

One of the fascinating aspects of all of this is that probably the optimum way in which the car was built could be totally laid out on a CAD system. Different cars would use different sequences or different ideas. You could build anything given this approach, just as humans could in a garage if they were presented with a kit of parts. Note too that the CAD system could also design the target on the part—specifying special stamped in (cut in, molded in, etc.) targets etc. at certain points on the part surface. The CAD system too would not only know the location of the targets to other part features, but to all other targets on all other parts used to form the assembly.

I claim:

1. A method of correcting robot position comprising the steps of:

providing a computer-programmed robot having a work area and programmed to execute predetermined working movements relative to an object to be worked by the robot, providing at least one electro-optical sensor on said robot, providing at least one reference point fixed in or near the work area of the robot, sensing said reference point with said sensor, determining relative position data between said robot and said reference point, and providing a correction signal to said robot based on said relative position data for correcting a predetermined working movement of said robot.

2. A method according to claim 1 wherein said sensor includes a matrix array TV camera.

3. A method according to claim 1 wherein said sensor is a stereo pair of TV cameras.

4. A method according to claim 1 wherein said reference point is visible when an object is worked by said robot.

5. A method according to claim 1 wherein said reference point is on a holding device for an object worked by said robot.

6. A method according to claim 1 wherein a plurality of reference points are used at different locations in the robot work area.

7. A method according to claim 1 wherein said reference point comprises a plurality of reference points in a group providing additional axes information.

8. A method according to claim 1 wherein said robot includes a guidance computer which automatically creates a program for said robot.

9. A method according to claim 1 wherein said reference point is sensed in at least two axes.

10. A method according to claim 1 wherein said reference point is visible when an object worked by said robot is moved away.

11. A method of correcting robot position comprising the steps of:

providing a computer-programmed robot having a work area and programmed to execute predetermined working movements, providing at least one electro-optical sensor fixed in or near the work area of the robot, providing at least one reference point on said robot, sensing said reference point with said sensor, determining relative position data between said robot and said reference point, and providing a correction signal to said robot based on said relative position data for correcting a predetermined working movement of the robot.

12. A method according to claim 11 wherein said sensor includes a matrix array TV camera.

13. A method according to claim 11 wherein said sensor comprises a stereo pair of TV cameras.

14. A method according to claim 11 wherein said reference point comprises a plurality of reference points arranged in a group to provide additional axes information.

15. A method according to claim 11 wherein said robot includes a guidance computer which automatically creates a program for said robot.

16. A method according to claim 11 wherein said reference point is sensed in at least two axes.

17. A method of correcting robot position comprising the steps of:

providing a computer-programmed robot having a work area and programmed to execute working movements relative to an object to be worked by the robot providing at least one electro-optical sensor providing at least one reference point on a holding device for the object to be worked by the robot, sensing said reference point with said sensor, determining relative position data between said robot and said reference point, and providing a correction signal to said robot based on said relative position data for correcting a predetermined working movement of said robot.

18. A method according to claim 17 wherein said sensor includes a matrix array TV camera.

19. A method according claim 17 wherein said sensor is a stereo pair of TV cameras.

20. A method according to claim 17 wherein said at least one reference point comprises a plurality of reference points arranged in a group to provide additional axes information.

* * * * *